United States Patent
Park et al.

(10) Patent No.: US 8,359,519 B2
(45) Date of Patent: Jan. 22, 2013

(54) COOPERATIVE TRANSMISSION METHOD AND COMMUNICATION SYSTEM USING THE SAME

(75) Inventors: Chul Gyun Park, Gyunggi-do (KR); In Duk Han, Seoul (KR); Won Jin Lee, Seoul (KR); Jun Heo, Seoul (KR); Joun Sup Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 370 days.

(21) Appl. No.: 12/840,459

(22) Filed: Jul. 21, 2010

(65) Prior Publication Data
US 2011/0126077 A1 May 26, 2011

(30) Foreign Application Priority Data
Nov. 20, 2009 (KR) .................. 10-2009-0112552

(51) Int. Cl.
*H03M 13/00* (2006.01)
(52) U.S. Cl. ........................................ 714/755
(58) Field of Classification Search .................... None
See application file for complete search history.

(56) References Cited

U.S. PATENT DOCUMENTS

| | | | |
|---|---|---|---|
| 2007/0058577 A1* | 3/2007 | Rubin | 370/328 |
| 2008/0282133 A1 | 11/2008 | Lo et al. | |
| 2009/0175214 A1* | 7/2009 | Sfar et al. | 370/315 |
| 2009/0268662 A1* | 10/2009 | Larsson et al. | 370/328 |
| 2009/0287979 A1* | 11/2009 | Wang et al. | 714/752 |
| 2010/0157901 A1* | 6/2010 | Sanderovitz et al. | 370/328 |
| 2011/0044379 A1* | 2/2011 | Lilleberg et al. | 375/211 |
| 2011/0128883 A1* | 6/2011 | Chung et al. | 370/252 |
| 2011/0182187 A1* | 7/2011 | Jeong et al. | 370/242 |
| 2011/0307756 A1* | 12/2011 | Nguyen et al. | 714/752 |
| 2012/0155373 A1* | 6/2012 | Yokomakura et al. | 370/315 |

FOREIGN PATENT DOCUMENTS

| | | | |
|---|---|---|---|
| KR | 1020090055338 A | | 6/2009 |
| KR | 1020090055776 A | | 6/2009 |

* cited by examiner

Primary Examiner — Gabriel Chu
(74) *Attorney, Agent, or Firm* — Lowe Hauptman Ham & Berner, LLP

(57) ABSTRACT

A cooperative transmission method includes: a first operation of coding, by a source node, a message desired to be transmitted according to a first encoding scheme to generate a first codeword and transmitting the first codeword to a relay node and a destination node; a second operation of decoding, by the relay node, the first codeword which has been received from the source node, coding the decoded message according to a second coding scheme to generate a second codeword, coding a part corresponding to parity of the second codeword according to the first coding scheme to generate a third codeword, and transmitting the third codeword to the destination node; and a third operation of decoding, by the destination node, the first codeword which has been received from the source node and the third codeword which has been received from the relay node, combining the message generated by decoding the first codeword and the parity part of the second codeword generated by decoding the third codeword to generate a fourth codeword according to the second coding scheme, and decoding the fourth codeword to estimate the message desired to be transmitted.

14 Claims, 6 Drawing Sheets

COOPERATIVE TRANSMISSION METHOD AND COMMUNICATION SYSTEM USING THE SAME

CROSS-REFERENCE TO RELATED APPLICATIONS

This application claims the priority of Korean Patent Application No. 10-2009-0112552 filed on Nov. 20, 2009 in the Korean Intellectual Property Office, the disclosure of which is incorporated herein by reference.

BACKGROUND OF THE INVENTION

1. Field of the Invention

The present invention relates to a cooperative transmission method and a communication system using the same and, more particularly, to a cooperative transmission method capable of effectively reducing the quantity of transmission data while minimizing degradation of quality of service (QoS), and a communication system using the same.

2. Description of the Related Art

Recently, various techniques such as orthogonal frequency division multiplexing (OFDM), multiple input multiple output (MIMO), smart antennas, and the like, have been introduced to achieve a high data transmission rate. However, a request for a high data transmission rate in a state in which transmission power is limited may bring about an increase in an error rate and a reduction in a communication available distance. Thus, in order to solve this problem, research on a cooperative transmission method using a repeater is actively ongoing.

The cooperative transmission method using a repeater may be divided into an amplify-and-forward (AF) type cooperative transmission method and a decode-and-forward (DF) type cooperative transmission method. In the AF type cooperative transmission method, a repeater amplifies a signal which has been received from a terminal, and transmits the amplified signal to a base station, so the size of data transmitted in a second frame may be equal to the size of the data the terminal transmits to the base station. In the DF type cooperative transmission method, when an encoding scheme used in the repeater is used in the same manner as that of the terminal, the size of data transmitted in the second frame is the same. However, when a different encoding scheme from that used in the terminal is used in the repeater, the size of data transmitted in the second frame from the repeater to the base station can be adjusted. In this case, however, when the size of the data in the repeater is reduced, the QoS of the data received by the base station is degraded. Therefore, a method for effectively reducing the quantity of data transmitted in the second frame while minimizing degradation of QoS is required.

SUMMARY OF THE INVENTION

An aspect of the present invention provides a cooperative transmission method capable of reducing the quantity of transmission data as well as minimizing degradation of quality of service (QoS), and a communication system using the same.

According to an aspect of the present invention, there is provided a cooperative transmission method including: a first operation of coding, by a source node, a message desired to be transmitted according to a first encoding scheme to generate a first codeword and transmitting the first codeword to a relay node and a destination node; a second operation of decoding, by the relay node, the first codeword which has been received from the source node, coding the decoded message according to a second coding scheme to generate a second codeword, coding a part corresponding to parity of the second codeword according to the first coding scheme to generate a third codeword, and transmitting the third codeword to the destination node; and a third operation of decoding, by the destination node, the first codeword which has been received from the source node and the third codeword which has been received from the relay node, combining the message generated by decoding the first codeword and the parity part of the second codeword generated by decoding the third codeword to generate a fourth codeword according to the second coding scheme, and decoding the fourth codeword to estimate the message desired to be transmitted.

The first coding scheme may be a coding scheme using a convolutional code. In particular the first coding scheme may be a coding scheme using a Trellis code.

The second coding scheme may be a coding scheme using a systematic block code including parity for detecting an error. In particular, the second coding scheme may be a coding scheme using a Reed-Solomon code.

The message which is coded according to the first coding scheme and desired to be transmitted in the first operation may include a cyclic redundancy check (CRC) value. The second operation may further include: decoding the first codeword which has been received from the source node and checking the CRC value from the decoded message to inspect whether or not a reception error has been generated. If no reception error has been generated, the decoded message may be coded according to the second coding scheme to generate a second codeword, and a part of the second codeword corresponding to parity may be coded according to the first coding scheme to generate a third codeword, and the third codeword may be transmitted to the destination node.

According to another aspect of the present invention, there is provided a cooperative transmission communication system including: a source node decoding a message desired to be transmitted according to a first encoding scheme to generate a first codeword and transmitting the first codeword; a relay node decoding the first codeword which has been received from the source node, coding the decoded message according to a second coding scheme to generate a second codeword, coding a part corresponding to parity of the second codeword according to the first coding scheme to generate a third codeword, and transmitting the third codeword to the destination node; and the destination node decoding the first codeword which has been received from the source node and the third codeword which has been received from the relay node, combining the message generated by decoding the first codeword and the parity part of the second codeword generated by decoding the third codeword to generate a fourth codeword according to the second coding scheme, and decoding the fourth codeword to estimate the message desired to be transmitted.

BRIEF DESCRIPTION OF THE DRAWINGS

The above and other aspects, features and other advantages of the present invention will be more clearly understood from the following detailed description taken in conjunction with the accompanying drawings, in which:

FIGS. 5 and 6 are graphs showing the comparison between the performance of the cooperative transmission method according to an exemplary embodiment of the present invention and that of the related art, wherein FIG. 5 illustrates frame error rates (FER) and FIG. 6 illustrates throughput.

DETAILED DESCRIPTION OF THE PREFERRED EMBODIMENT

Figure 1:
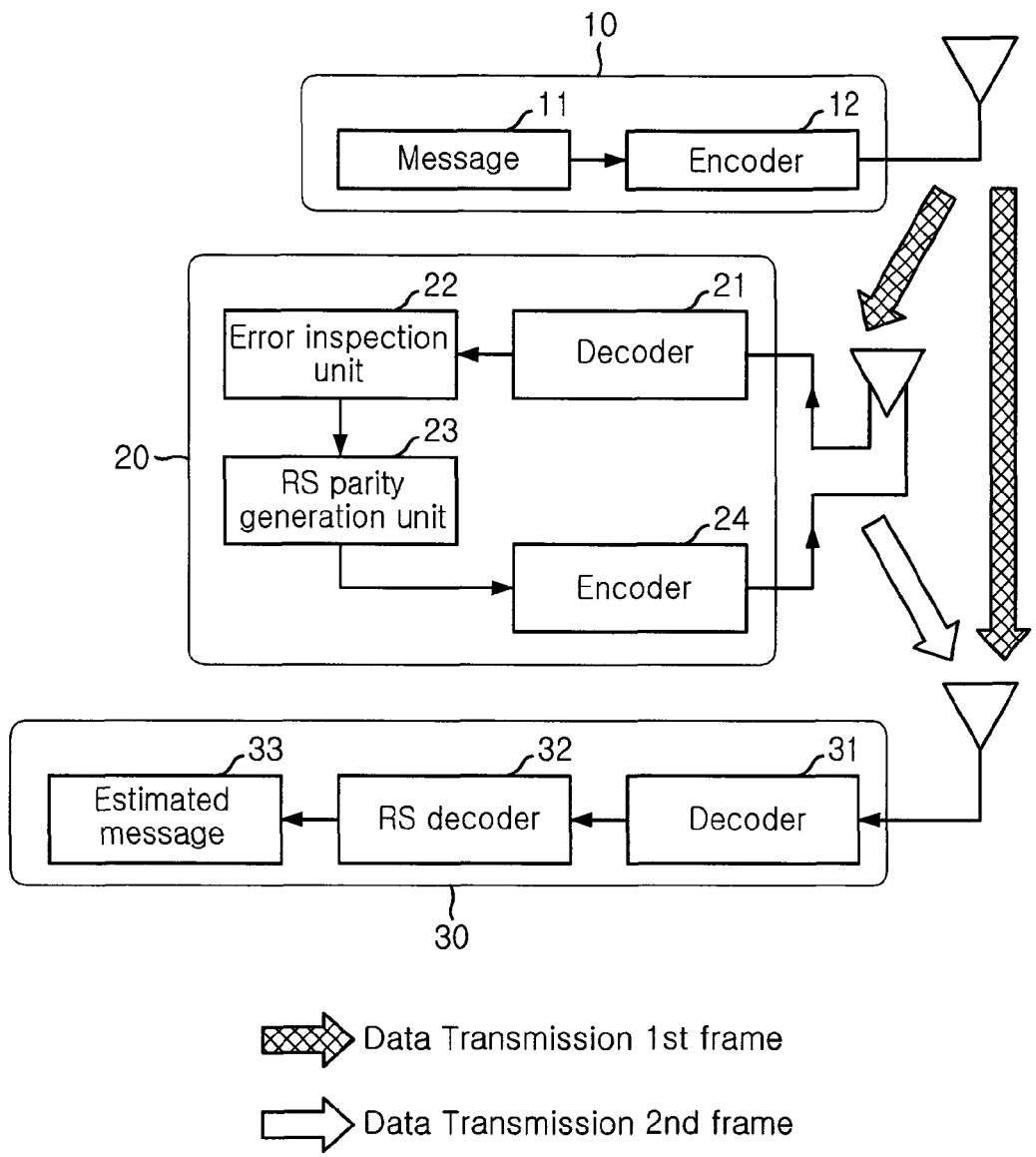
FIG. 1 is a schematic block diagram of a communication system employing a cooperative transmission method according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram of a communication system employing a cooperative transmission method according to an exemplary embodiment of the present invention.

As shown in FIG. 1, the communication system employing the cooperative transmission method according to an exemplary embodiment of the present invention may include a source node 10, a relay node 20, and a destination node 30. The source node 10 may be a communication terminal used by a user, the relay node 20 may be a repeater (or relay) connecting the user's communication terminal and a base station, and the destination node 30 may be a mobile communication base station.

The source node 10 may include an encoder 12 for encoding a message 11 according to a first coding scheme. The message 11 may include a cyclic redundancy check (CRC) value for an error inspection.

The first coding scheme allows for the coding of the message 11 by using a convolutional code. The convolutional code, a variety of code that can perform an error correction, may be expressed to have an m/n code rate of converting an m bit symbols into n bit symbols. The convolutional code is used to improve performance in the communication field such as in the case of a digital radio, a mobile phone, a satellite connection, Bluetooth, and the like In particular, in the present invention, a Trellis code may be used as the convolutional code.

The source node 10 codes the message 11 according to the first coding scheme to generate a codeword and transmits the first codeword to the relay node 20 and the destination node 30.

The relay node 20 may include a decoder 21 for receiving the first codeword from the source node 10, an error inspection unit 22 for inspecting an error by checking the CRC value of the message which has been decoded by the decoder, a parity generation unit 23 for coding the message, which does not have an error according to the error inspection result, according to a second coding scheme and outputting only a parity part of a generated second codeword, and an encoder 24 for coding the parity part according to the first coding scheme.

The decoder 21 decodes the first codeword, the outcome of the first coding scheme. In decoding the first codeword, a Viterbi algorithm, which is largely used to decode a codeword coded as a convolutional code, may be used.

The error inspection unit 22 checks the CRC value of the decoded message to inspect whether or not there is an error. If there is no error in the message, a follow-up process is performed.

The parity generation unit 23 decodes the error inspection-completed message by using a second coding scheme. As the second coding scheme employed in this case, a coding scheme using a systematic block code including a parity for detecting an error may be used.

The systematic code refers to a code in which input bits appear from a coded output, and a non-systematic code refers to a code in which input bits do not appear from an output. Also, the coding of a message desired to be transmitted may be performed such that the message is divided into blocks having a certain size and an error detection bit is added to each block. In particular, a coding scheme using a Reed-Solomon code may be employed as the coding scheme using the systematic block code.

The Reed-Solomon code is one of a variety of codes that can correct a burst error, which was developed by Reed and Solomon. The Reed-Solomon code may be specified with 'RS(m,k)', which means that when k number of symbols are coded, error correction parities corresponding to (m-k) number of symbols are added to code them. Because the Reed-Solomon code has excellent error correction capabilities, it has good capability for correcting a random error. Thus, the Reed-Solomon code is associated with a convolutional code widely used in a terrestrial radio communication sector and widely used for wireline communications and encrypted communications so as to be used to remove a channel error in space communications, satellite communications, and satellite broadcasts, the environment in which both a random error and a burst error occur. In addition, the Reed-Solomon code is commonly applied to correct an error in a communication system such as a mobile communications system, a spread spectrum system, etc, and a storage medium such as a computer storage device, a compact disk (CD), and a digital audio tape (DAT). Also, the Reed-Solomon code is adopted for a digital video broadcast (DVB) transmission standard.

The parity generation unit 23 performs coding using the Reed-Solomon code, and outputs a part corresponding to parity, excluding a part corresponding to the message, in the codeword generated from the coding using the Reed-Solomon code, so it is depicted as an RS parity generation unit as illustrated in FIG. 1.

The encoder 24 codes the parity part of the second codeword output from the parity generation unit 23 according to the first coding scheme (e.g., coding using the convolutional code and coding using the Trellis code) to generated a third codeword, and transmits the third codeword.

The destination node 30 may include a decoder 31 for decoding the first and third codewords respectively received from the source node 10 and the relay node 20, and a decoder 32 for combining the decoding results from the decoder 30 to generate a fourth codeword, and decodes it again to generate an estimated message 33.

The decoder 31 decodes the first and third codewords which have been coded according to the first coding scheme. Because the first and third codewords are coded according to the first coding scheme, the same coding scheme as described above, the codewords received from the source node 10 and the relay node 20 can be decoded by using the single decoder 31.

When the first codeword is decoded, a message part is generated, and when the third codeword is decoded, a parity part of the codeword which has been coded according to the second coding scheme (coding using the systematic block code and coding using the Reed-Solomon code) is generated.

The decoder 32 combines the message part and the parity part which have been generated by the decoder 31 to generate a new codeword, which is the same as that coded according to the second coding scheme, decodes the new codeword to correct an error due to the parity, and finally outputs the estimated message 33.

Figure 2:
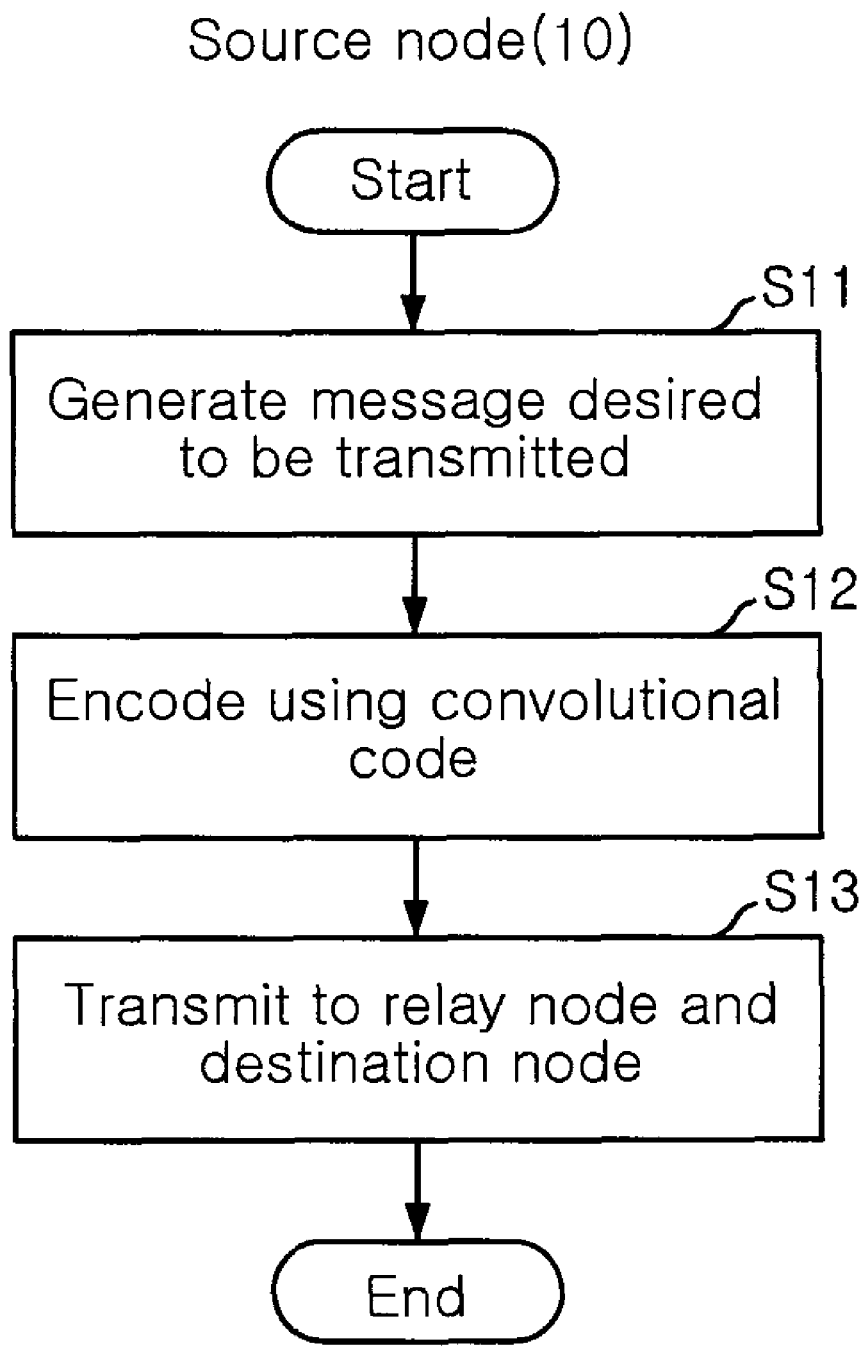
FIGS. 2 to 4 are flow charts illustrating the process of the cooperative transmission method based on each node of a communication system according to an exemplary embodiment of the present invention.
Figure 3:
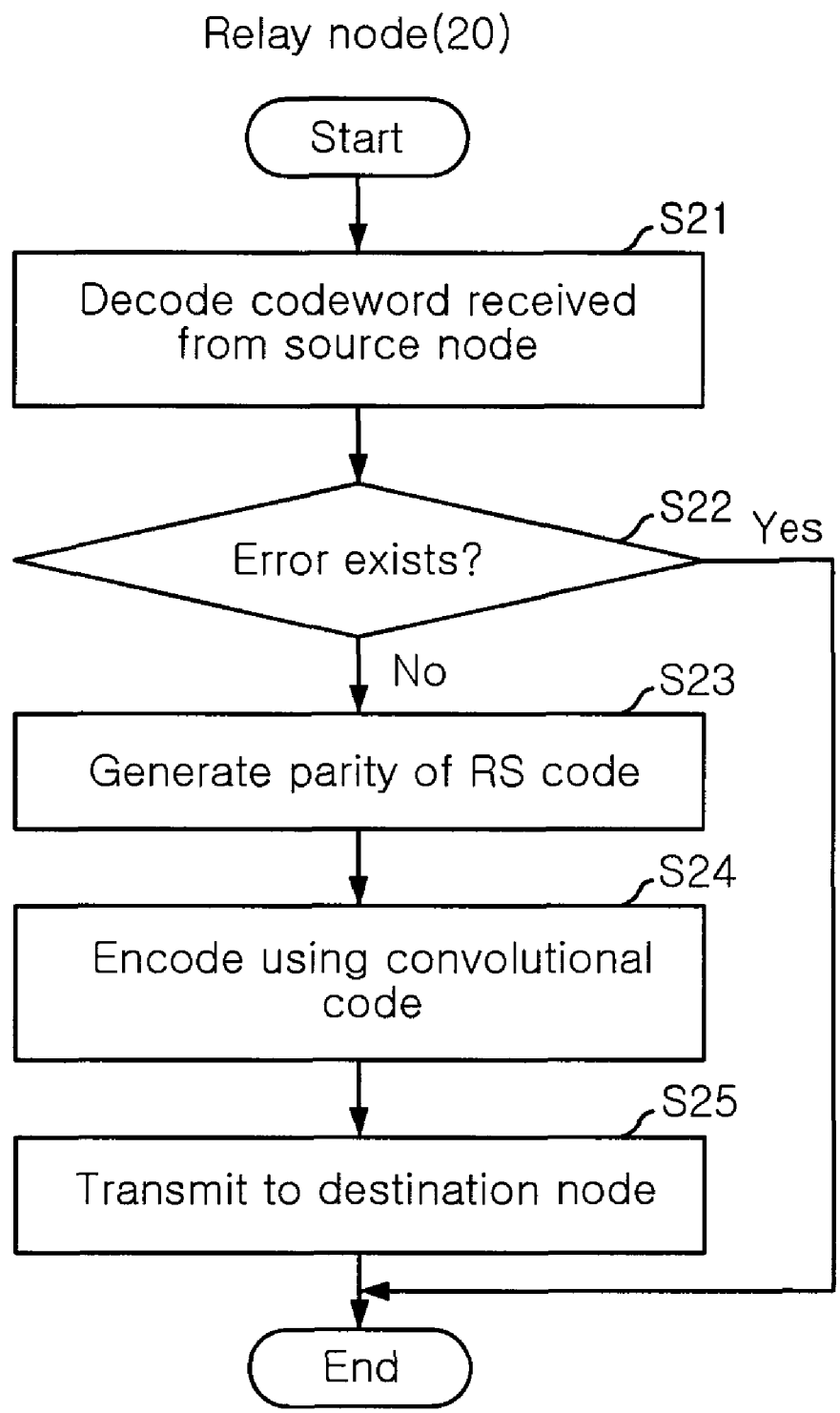
Figure 4:
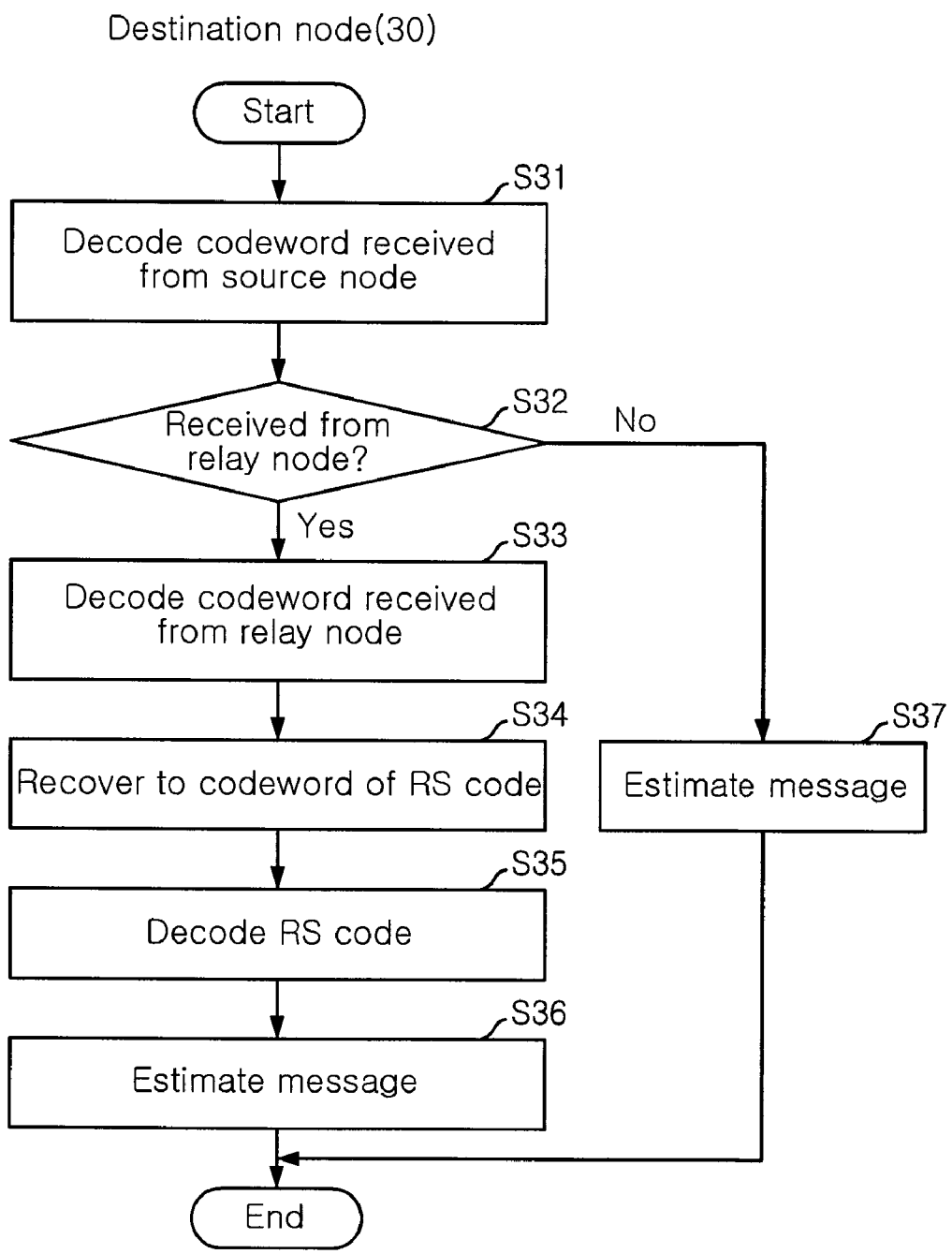

FIGS. 2 to 4 are flow charts illustrating the process of the cooperative transmission method based on each node of a communication system according to an exemplary embodiment of the present invention.

As shown in FIG. 2, according to the cooperative transmission method according to an exemplary embodiment of the present invention, the source node 10 generates a message (S11), codes the generated message according to the first coding scheme (i.e., coding using a convolutional code or a Trellis code) (s12), and transmits the first codeword generated by the coding to the relay node 20 and the destination node 30.

Next, as shown in FIG. 3, the relay node 20 decodes the first codeword which has been received from the source node 10 (S21) and inspects whether or not there is an error in the decoded message through CRC checking (S22). If there is no error in the decoded message, the relay node 20 codes the decoded message according to the second coding scheme (i.e., coding using the systematic block code or coding using the Reed-Solomon code) to generates the second codeword to generate parity (S33), codes the part corresponding to the parity of the second codeword according to the first coding scheme (i.e., coding using the convolutional code or the Trellis code) to generate the third codeword (S34), and transmits the third codeword to the destination node (S35).

Then, as shown in FIG. 4, the destination node 30 decodes the first codeword which has been received from the source node 10 to generate a message (S31), and when the third codeword is received from the relay node 20 (S32), the destination node 30 decodes the third codeword (S33), combines the message which has been generated by decoding the first codeword and the parity part of the second codeword which has been generated by decoding the third codeword to generate the fourth codeword of the second coding scheme (i.e., coding using the systematic block code and coding using the Reed-Solomon code) (S34), and decodes the fourth codeword (S36) to estimate a message desired to be transmitted (S36). When an error is detected through CRC checking in the relay node 20 (S22), data transmission from the relay node 20 to the destination node 30 is not made, so the destination node 30 does not receive the third codeword from the relay node 20. In this case, the destination node 30 may estimate the message only with the first codeword which has been received from the source node 10 (S37).

As described above, in the exemplary embodiment of the present invention, the data transmitted from the relay node 20 to the destination node 30 is a codeword obtained by coding the parity part generated by coding using the systematic block code and coding using the Reed-Solomon code, so the amount of data transmission can be drastically reduced compared with a case in which the entire message is transmitted. Also, because an error inspection is performed through CRC checking in the relay node and the error inspection and error correction are performed again when the message and parity are combined to be decoded in the destination node, degradation of QoS can be minimized.

Figure 5:
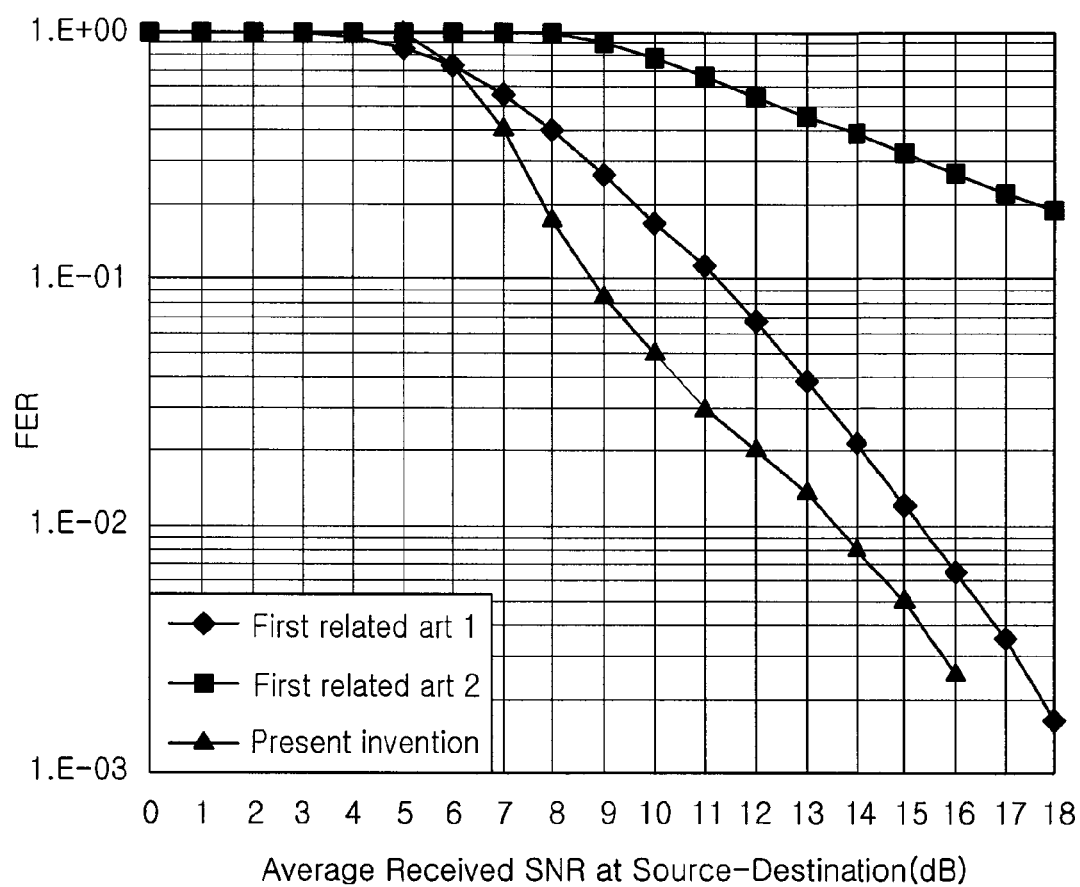
Figure 6:
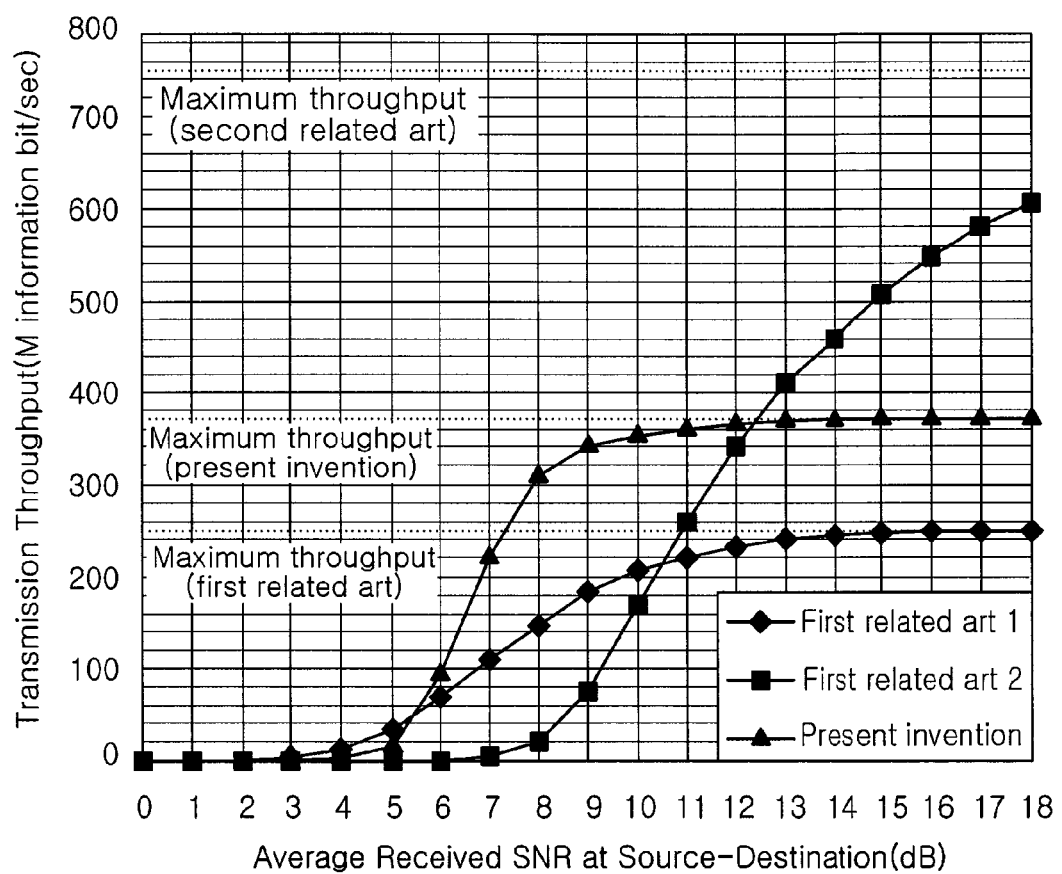

FIGS. 5 and 6 are graphs showing the comparison between the performance of the cooperative transmission method according to an exemplary embodiment of the present invention and that of the related art, wherein FIG. 5 illustrates frame error rates (FER) and FIG. 6 illustrates throughput.

Specifically, FIGS. 5 and 6 are graphs showing the results in a Rayleigh fading channel of a 60 GHz band by employing the coding scheme using a Trellis code of a ½ code rate as the first and third coding schemes, and the coding scheme using a Reed-Solomon code of RS(255,191) as the second coding scheme. Also, the first related art in FIGS. 5 and 6 employed the method of coding and decoding a message by using only convolution codes and cooperatively transmitting the same, and the second related art employed a method of coding and decoding a message by using only Reed-Solomon codes and cooperatively transmitting the same.

As shown in FIG. 5, it is noted that the cooperative transmission method according to an exemplary embodiment of the present invention exhibits a remarkably low error rate as compared with the related art.

Also, as shown in FIG. 6, the cooperative transmission method according to an exemplary embodiment of the present invention exhibits a higher throughput compared with the cooperative transmission scheme of the related art in an environment in which a signal-to-noise-ratio (SNR) is low and that the cooperative transmission method according to an exemplary embodiment of the present invention can output a maximum throughput even in the environment in which the SNR is low. In an environment in which the SNR is quite high, the second related art exhibits a higher throughput, but such an environment having that high an SNR ratio cannot be implemented in an actual communication environment, so it is therefore meaningless. Also, even in the environment in which the SNR is quite high, the second related art fails to output its maximum throughput.

Therefore, it can be noted from FIGS. 5 and 6 that the cooperative transmission method according to an exemplary embodiment of the present invention achieves a higher throughput by reducing the amount of data transmission while maintaining high QoS as compared with the related art.

As set forth above, according to exemplary embodiments of the invention, because the data transmitted from the relay node to the destination node is a codeword obtained by coding a parity part generated through coding using a systematic block code or coding using a Reed-Solomon code, the amount of data transmission can be drastically reduced compared with the case where the entire message is transmitted.

Also, because the relay node performs an error inspection through CRC checking and the error inspection and error correction are performed again in the process of combining the message and the parity and decoding them in the destination node, degradation of QoS can be minimized.

While the present invention has been shown and described in connection with the exemplary embodiments, it will be apparent to those skilled in the art that modifications and variations can be made without departing from the spirit and scope of the invention as defined by the appended claims.

What is claimed is:

1. A cooperative transmission method comprising:
 a first operation of coding, by a source node, a message desired to be transmitted according to a first encoding scheme to generate a first codeword and transmitting the first codeword to a relay node and a destination node;
 a second operation of decoding, by the relay node, the first codeword which has been received from the source node, coding the decoded message according to a second coding scheme to generate a second codeword, coding a part corresponding to parity of the second codeword according to the first coding scheme to generate a third codeword, and transmitting the third codeword to the destination node; and a third operation of decoding, by the destination node, the first codeword which has been received from the source node and the third codeword which has been received from the relay node, combining the message generated by decoding the first codeword and the parity part of the second codeword generated by decoding the third codeword to generate a fourth codeword according to the second coding scheme, and decoding the fourth codeword to estimate the message desired to be transmitted.

2. The method of claim 1, wherein the first coding scheme is a coding scheme using a convolutional code.

3. The method of claim 1, wherein the first coding scheme is a coding scheme using a Trellis code.

4. The method of claim 1, wherein the second coding scheme is a coding scheme using a systematic block code including parity for detecting an error.

5. The method of claim 1, wherein the second coding scheme is a coding scheme using a Reed-Solomon code.

6. The method of claim 1, wherein the message which is coded according to the first coding scheme and desired to be transmitted in the first operation comprises a cyclic redundancy check (CRC) value.

7. The method of claim 6, wherein the second operation further comprises decoding the first codeword which has been received from the source node and checking the CRC value from the decoded message to inspect whether or not a reception error has been generated, and if no reception error has been generated, the decoded message is coded according to the second coding scheme to generate a second codeword, and a part of the second codeword corresponding to parity is coded according to the first coding scheme to generate a third codeword, and the third codeword is transmitted to the destination node.

8. A cooperative transmission communication system comprising:

a source node decoding a message desired to be transmitted according to a first encoding scheme to generate a first codeword and transmitting the first codeword;

a relay node decoding the first codeword which has been received from the source node, coding the decoded message according to a second coding scheme to generate a second codeword, coding a part corresponding to parity of the second codeword according to the first coding scheme to generate a third codeword, and transmitting the third codeword to the destination node; and the destination node decoding the first codeword which has been received from the source node and the third codeword which has been received from the relay node, combining the message generated by decoding the first codeword and the parity part of the second codeword generated by decoding the third codeword to generate a fourth codeword according to the second coding scheme, and decoding the fourth codeword to estimate the message desired to be transmitted.

9. The system of claim 8, wherein the first coding scheme is a coding scheme using a convolutional code.

10. The system of claim 8, wherein the first coding scheme is a coding scheme using a Trellis code.

11. The system of claim 8, wherein the second coding scheme is a coding scheme using a systematic block code including parity for detecting an error.

12. The system of claim 8, wherein the second coding scheme is a coding scheme using a Reed-Solomon code.

13. The system of claim 8, wherein the message which is coded according to the first coding scheme and desired to be transmitted by the source node comprises a cyclic redundancy check (CRC) value.

14. The system of claim 13, wherein the relay node decodes the first codeword which has been received from the source node and checks the CRC value from the decoded message to inspect whether or not a reception error has been generated, and if no reception error has been generated, the relay node codes the decoded message according to the second coding scheme to generate a second codeword, and codes a part of the second codeword corresponding to parity according to the first coding scheme to generate a third codeword, and transmits the third codeword to the destination node.

\* \* \* \* \*